United States Patent [19]

Cox

[11] 4,137,802
[45] Feb. 6, 1979

[54] CUTTING TOOL ARRANGEMENT FOR USE IN A LATHE

[75] Inventor: Richard E. Cox, Watford, England

[73] Assignees: Dealey & Burrow Limited; Whippendell Electrical Manufacturing Company, both of Watford, England

[21] Appl. No.: 865,263

[22] Filed: Dec. 28, 1977

[30] Foreign Application Priority Data

Dec. 30, 1976 [GB] United Kingdom ............... 54387/76

[51] Int. Cl.² .......................... B23B 3/28; B23B 3/00; B23B 29/00
[52] U.S. Cl. ......................................... 82/11; 82/2 B; 82/36 R
[58] Field of Search ...................... 82/11, 14, 14.5, 18, 82/2 R, 2 B, 36 R, 36 A

[56] References Cited

U.S. PATENT DOCUMENTS

| | | | |
|---|---|---|---|
| 1,677,131 | 7/1928 | Cole et al. | 82/14 E |
| 2,680,389 | 6/1954 | Zeller et al. | 82/11 |
| 3,301,099 | 1/1967 | Stecker | 82/11 |
| 3,324,364 | 6/1967 | Caruthers | 82/2 B |
| 3,691,879 | 8/1972 | Blake | 82/2 B |
| 4,061,059 | 12/1977 | Keller | 82/11 |

Primary Examiner—Harrison L. Hinson
Attorney, Agent, or Firm—Pollock, Vande Sande & Priddy

[57] ABSTRACT

A cutting tool arrangement is disclosed for use in a preprogrammed lathe that comprises a rotary driven chuck holding a workpiece, a rotary turret carrying a plurality of tools and mounted for movement longitudinally of the axis of rotation of the chuck, and a cross slide mounted for movement transversely of the rotational axis of the chuck. The cutting tool arrangement comprises a support member for being mounted on the cross slide, a sliding member mounted on and for sliding movement transversely of the elongate member, said sliding member having mounted thereon at one end thereof a workpiece cutting tool, and a follower member for being mounted on the turret so that upon movement of the turret towards the chuck the follower abuts the sliding member to cause the cutting tool to be swept longitudinally of the workpiece. The cutting tool arrangement allows the lathe to cut in the workpiece grooves that are wider than the workpiece cutting tool, with only the requirement that the lathe be appropriately programmed, no changes in the way in which the lathe itself operates being required other than the fitment of the arrangement of the invention.

9 Claims, 5 Drawing Figures

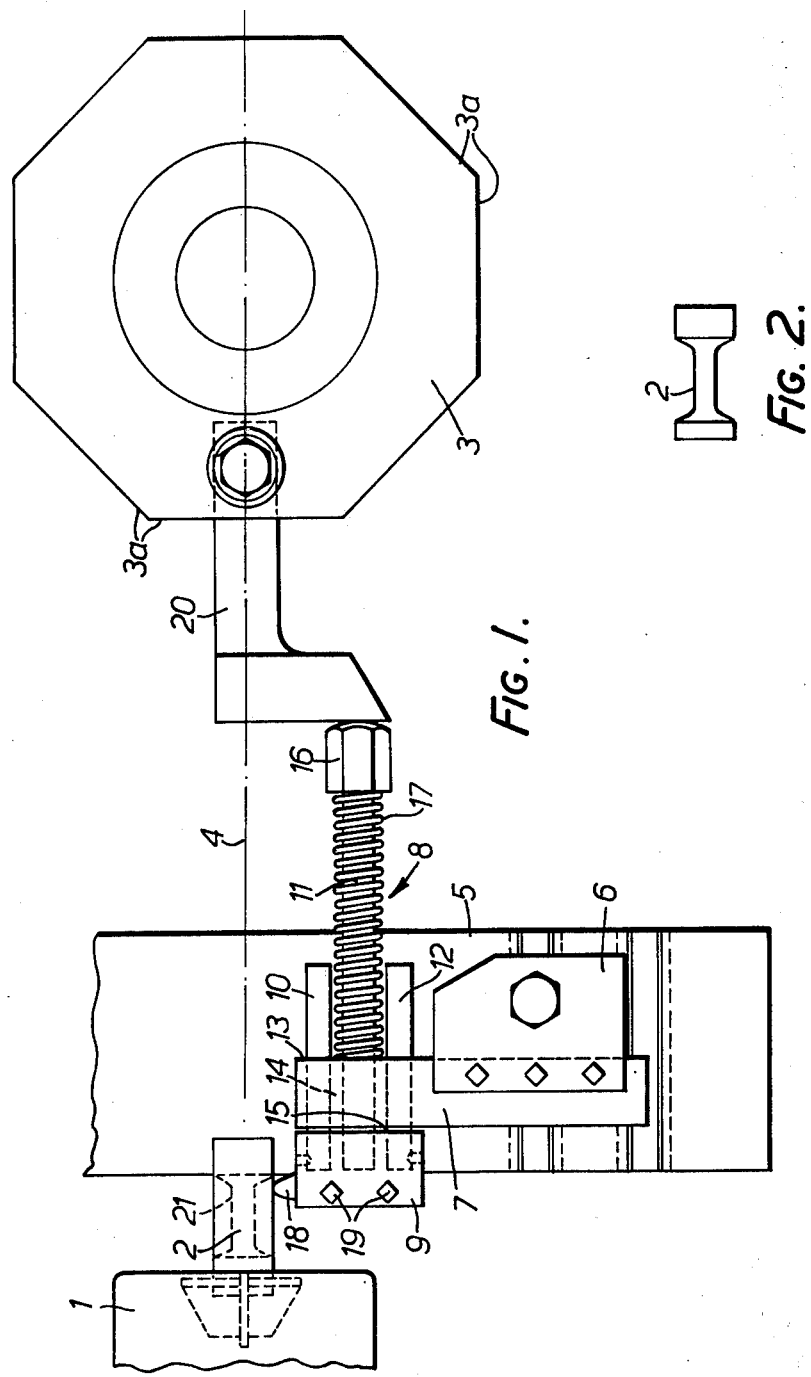

CUTTING TOOL ARRANGEMENT FOR USE IN A LATHE

FIELD OF THE INVENTION

The present invention relates to a cutting tool arrangement for use in a lathe.

BACKGROUND TO THE INVENTION

It is well known to provide a lathe comprising a rotary driven chuck for holding and rotating a workpiece, a tool carrying turret mounted for movement both longitudinally of the axis of rotation of the chuck and about an axis extending transversely of the rotation axis of the chuck so as to permit different tools mounted on the turret to be brought into cutting engagement with the workpiece, and a cross slide mounted for movement transversely of the rotation axis of the chuck, the cross slide being adapted to have mounted thereon a cutting tool which is movable by the cross slide into cutting engagement with the workpiece to cut a peripheral groove therein.

A lathe of this kind is particularly suited to preprogrammable automatic operation, but suffers from the disadvantage that a tool on the cross slide can only cut in the workpiece a groove of a width defined by the width of the tool, and moreover the width of the tool which can be used is restricted by the fact that a small diameter workpiece tends to get broken or bent by the cutting engagement of a wide tool with the workpiece.

SUMMARY OF THE INVENTION

It is an object of the present invention to provide a cutting tool arrangement for use in a lathe, which can cut in the workpiece a groove wider than the tool.

It is a more particular object of the invention to provide a cutting tool arrangement for use in the known lathe aforementioned, which can cut in the workpiece grooves and other machined shapes which extend along the workpiece for a distance greater than the width of the tool.

These objects and others are accomplished by means of the present invention by providing a cutting tool arrangement for use in a lathe, which permits the tool to be swept longitudinally of the axis of rotation of the workpiece whereby to cut therein a peripheral groove wider than the tool.

More specifically, in accordance with the present invention there is provided a cutting tool arrangement for use in a lathe that comprises a rotary driven chuck for holding and rotating a workpiece, a rotary turret adapted to carry a plurality of tools for performing machining operations on the workpiece, the turret being mounted for movement longitudinally of the axis of rotation of the chuck, and a cross slide mounted for movement transversely of the rotational axis of the chuck, said arrangement comprising an elongate member for being mounted on the cross slide, said member having mounted thereon for sliding movement transversely thereof an elongate sliding member adapted to receive at one end thereof a workpiece cutting tool, and a follower member for being mounted on the turret so that upon movement of the turret towards the chuck the follower abuts the sliding member to cause the cutting tool to be swept longitudinally of the workpiece.

The arrangement of the present invention has the advantage that it can be fitted to an existing lathe without requiring modification of the mechanism of the lathe, and if the lathe is of the preprogrammable kind aforementioned, the arrangement of the invention can be operated as part of the automatic machining sequence programmed into the lathe merely by modifying its programme.

This advantage together with other features and advantages of the invention will become more apparent from the following description of a preferred embodiment thereof, given by way of illustrative example with reference to the accompanying drawings.

BRIEF DESCRIPTION OF THE DRAWINGS

In the drawings:

FIG. 1 is a schematic plan view of a capstan lathe incorporating a cutting tool arrangement in accordance with the present invention;

FIG. 2 illustrates a workpiece cut by the arrangement shown in FIG. 1;

DESCRIPTION OF THE PREFERRED EMBODIMENT

Figure 4:
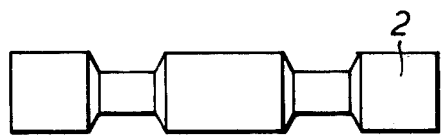
FIG. 4 illustrates a workpiece cut by the tool of FIG. 3.

Referring firstly to FIG. 1, there is shown a capstan lathe having a driven chuck 1 which holds and rotates a workpiece 2. A turret 3 is mounted for movement longitudinally of the axis of rotation 4 of the workpiece. The turret 3 comprises a hexagonal block, each hexagonal surface 3a of which is adapted to receive a tool for performing a cutting operation on the workpiece, the turret 3 being mounted for rotation transversely of the rotation axis of the workpiece to align the tools with the workpiece. The tools are not shown mounted on the turret but can comprise drills and threading dies which operate on the end of the workpiece 2 protruding from the chuck 1. The turret 3 is rotated, and driven along the rotation axis of the workpiece 2, by hydraulic motors (not shown).

To permit peripheral grooves and the like to be cut in the side of the workpiece, the lathe is provided with a cross slide 5 mounted for movement at right angles to the axis of rotation 4 of the chuck 1. The cross slide 5 is driven by a hydraulic motor (not shown). Mounted on the cross slide 5 is a tool post 6 for clamping a cutting tool on the slide, such that during workpiece cutting operations the cutting tool is moved by the cross slide 5 into cutting engagement with the workpiece 2.

A lathe having the features described hereinbefore with reference to the drawings, is well known, the lathe being programmable to perform a predetermined sequence of workpiece cutting operations by means of a plug board control system which operates the hydraulic motors. One such lathe is the "Auto Sprint Series E" manufactured by EMI-MEC Limited of East Grinstead, Sussex, England.

Mounted on the cross slide 5 and the turret 3 is an example of a cutting tool arrangement in accordance with the present invention.

The arrangement comprises an elongate support member 7 clamped by the tool post 6 on the cross slide 5, the support member 7 having mounted thereon a member 8 mounted to slide at right angles to the support member 7. The member 8 comprises a block 9 on which is mounted three parallel guide rods 10, 11, 12 which are slidably received in respective bores 13, 14, 15 in the support member 7. The guide rod 11 is longer than the other two rods and is fitted at its free end with a nut 16. A compression spring 17 is fitted over the rod 11 between the support member 7 and the nut 16, to urge the block 9 against the support member 7.

The block is adapted to receive a cutting tool 18, the tool being clamped in position by screws 19.

Mounted on the turret 3 is an L-shaped turret follower member 20 which is received in a bore in one of the tool receiving faces 3a, follower 20 being arranged to abut the nut 16 on the rod 11.

Thus, to form a peripheral groove in the workpiece, for example as shown in the dotted outline 21 on the workpiece 2, the turret 3 is rotated to align the follower 20 with the nut 16, and the turret is then moved longitudinally of the rotation axis 4 towards the workpiece, thereby causing the member 8 to slide relative to the support member 7. As a result, the cutting tool 18 is swept longitudinally of the workpiece. Simultaneously, the cross slide is moved so as to shift the tool 18 transversely of the rotation axis 4 to urge the tool into cutting engagement with the workpiece. In this way, a generally cylindrical workpiece can be cut by the tool 18 to the shape shown in FIG. 2. However, many other shapes of workpiece can be produced by means of the cutting tool arrangement, and if further drilling or like cutting operations need to be performed, the turret is rotated to bring other suitable tools (not shown) mounted thereon into alignment with the axis 4 to permit further cutting operations to be performed on the workpiece.

Figure 3:
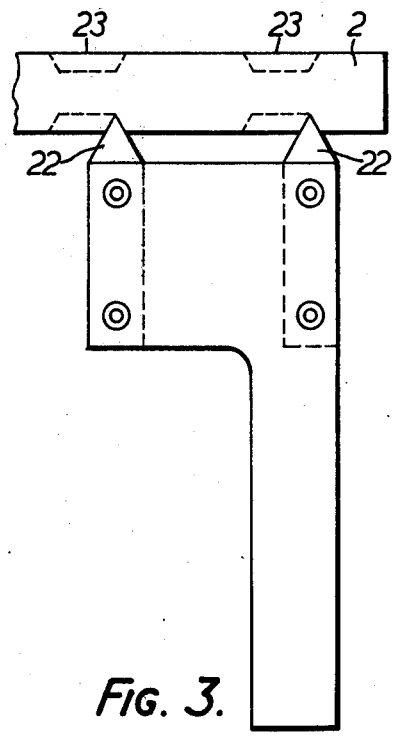
FIG. 3 is a schematic illustration of an alternative cutting tool for use in the arrangement of FIG. 1.

By using an appropriate cutting tool in the arrangement, more than one groove can be simultaneously cut in the workpiece. A tool for cutting two grooves simultaneously is shown in FIG. 3, and is designed as a replacement for the tool 18. The tool of FIG. 3 has two cutting heads 22 which in use will cut respective peripheral grooves 23 in the workpiece 2. A finished workpiece with peripheral grooves cut by means of the tool of FIG. 3, is shown in FIG. 4.

Figure 5:
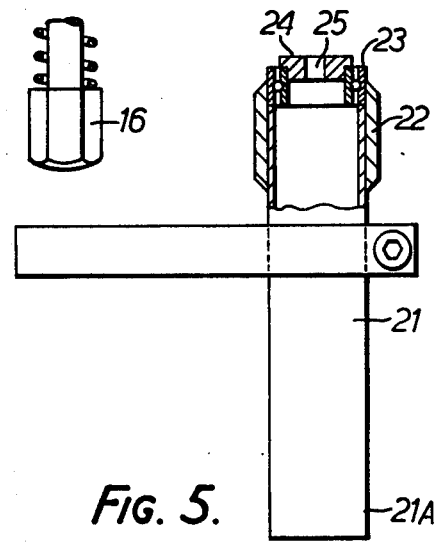
FIG. 5 illustrates another form of turret follower.

Many modifications to the described arrangement are possible and another form of the turret follower member is shown in FIG. 5. The turret follower comprises a hollow steel shaft 21 having an end 21A to be mounted in the turret 3. The other end of the shaft is fitted with a collar 22 in which is received a ball race 23 which rotatably mounts a steel plug 24 in the shaft. Also, clamped to the shaft 21 is a steel block 25 which defines a flange for abutting the nut 16 and moving the shaft 17 upon movement of the turret 3 towards the chuck. The turret follower of FIG. 5 is designed to provide support for elongate workpieces whilst they are cut by a tool such as 18. As the turret moves forward to sweep the tool 18 along the workpiece 2 in the chuck 1, the workpiece will pass into the shaft 21 through a bore 25 in the plug 24, rotation of the workpiece being accommodated by the bearing 23. Clearly, the plug is bored out to a size appropriate to the workpiece 2 or alternatively, the end of the workpiece is turned down in order to fit into the bore 25.

If it is desired to make conical shapes on the workpiece 2, the support member 7 can be mounted at an acute angle relative to the cross slide. Also, whilst in the above described arrangement, the block 9 slides relative to the member 7 by means of shafts 10, 11, 12 it will be appreciated that other slidable mountings could be used.

The cutting tool arrangement is particularly suited for use with an automatic lathe, since the arrangement can be operated by the conventional driving operations of the lathe, thereby requiring only a simple modification of the programming of the lathe. With modification the sliding member would be returned by a piston in a cylinder activated by compressed air. However, in a further modification, the sliding member would be driven directly by a fluid driven piston and cylinder assembly rather than by the turret follower.

I claim:

1. A cutting tool arrangement for use in a lathe that comprises a rotary driven chuck for holding and rotating a workpiece, a rotary turret adapted to carry a plurality of tools for performing machining operations on the workpiece, the turret being mounted for movement longitudinally of the axis of rotation of the chuck, and a cross slide mounted for movement transversely of the rotational axis of the chuck, said arrangement comprising
    (a) a support member for being mounted on the cross slide, a sliding member mounted on and for sliding movement transversely of the elongate member, said sliding member being adapted to receive at one end thereof a workpiece cutting tool, and
    (b) a follower member for being mounted on the turret so that upon movement of the turret towards the chuck the follower abuts the sliding member to cause the cutting tool to be swept longitudinally of the workpiece.

2. A lathe comprising
    (a) a rotary driven chuck for holding and rotating a workpiece,
    (b) tool carrying means for carrying a plurality of tools, said means being mounted for movement longitudinally of said axis and to rotate to bring different ones of said tools into a position to machine the workpiece,
    (c) a cross slide mounted for movement in a direction transverse to the axis of rotation of the chuck,
    (d) a support member mounted on the cross slide,
    (e) a sliding member mounted on the support member, to slide longitudinally of said axis,
    (f) a workpiece cutting tool mounted on the sliding member, and
    (g) driving means to move the sliding member relative to the support member for sweeping said workpiece cutting tool longitudinally of the workpiece and in cutting engagement therewith.

3. A lathe in accordance with claim 2 wherein said driving means comprises a rigid follower member mounted on said tool carrying means and arranged to abut the sliding member and cause sliding movement thereof relative to the support member upon movement of the tool carrying means towards the chuck.

4. A lathe in accordance with claim 3 wherein said follower member comprises a hollow shaft to receive therein an end of the workpiece, the shaft having affixed thereto a flange for abutting the sliding member.

5. A lathe in accordance with claim 3 wherein said driving means comprises a piston and cylinder assembly to be driven by a fluid to produce the sliding movement of the sliding member.

6. A lathe in accordance with claim 2 wherein said support member includes an elongate stem mounted longitudinally of the cross slide in a tool post, the sliding member being mounted on the support member adjacent one end thereof such that the sliding member can slide transversely of the support member, the sliding member being urged by a spring to a predetermined position relative to said sliding member.

7. A lathe in accordance with claim 6 wherein said sliding member comprises a block including clamping means for clamping a cutting tool on the block, the block being mounted on one end of a shaft slidably mounted in a bore in the support member, a spring being fitted over the shaft and arranged to urge the block against the support member.

8. A lathe in accordance with claim 7 including two support rods mounted on the block to extend in parallel to said shaft, the support rods being slidably received in bores in the support member.

9. In a preprogrammable automatic lathe comprising a rotary driven chuck for holding and rotating the workpiece; a rotary turret; tools mounted on the turret, for performing machining operations on the workpiece, said turret being mounted for movement longitudinally of the axis of rotation of the chuck in order to bring the tools into machining engagement with the workpiece; a cross slide mounted for movement in a direction transverse to said axis of rotation of the chuck; first motor means for driving the cross slide; second motor means for driving said turret in said longitudinal direction and for rotating said turret; and logic control means for operating said first and second motor means in a preprogrammed sequence; the improvement comprising a support member mounted on the cross slide; a sliding member mounted on the support member, to slide longitudinally of said axis of rotation of the chuck; a workpiece cutting tool mounted on the sliding member; and a turret follower member mounted on the turret, said turret follower member being so arranged to abut the sliding member and cause sliding movement of the sliding member relative to the support member upon movement of said turret towards the chuck whereby to sweep said workpiece cutting tool longitudinally of the workpiece to cut therein an indentation wider than said workpiece cutting tool.

* * * * *

UNITED STATES PATENT AND TRADEMARK OFFICE
CERTIFICATE OF CORRECTION

PATENT NO. : 4,137,802
DATED : FEBRUARY 6, 1979
INVENTOR(S) : RICHARD ERNEST COX

It is certified that error appears in the above-identified patent and that said Letters Patent are hereby corrected as shown below:

The complete name of the second assignee should read:

--Whippendell Electrical Manufacturing Company (Watford) Limited--

Signed and Sealed this

Fourth Day of December 1979

[SEAL]

Attest:

SIDNEY A. DIAMOND

Attesting Officer

Commissioner of Patents and Trademarks